United States Patent
Markey et al.

(10) Patent No.: US 11,425,067 B2
(45) Date of Patent: Aug. 23, 2022

(54) TECHNOLOGIES FOR GENERATING VISUALIZATIONS OF ELECTRONIC COMMUNICATIONS

(71) Applicant: RELATIVITY ODA LLC, Chicago, IL (US)

(72) Inventors: Douglas Markey, Western Springs, IL (US); Karl Knoernschild, La Grange, IL (US); Joseph Keslin, Munster, IN (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

(21) Appl. No.: 16/389,426

(22) Filed: Apr. 19, 2019

(65) Prior Publication Data
US 2020/0336446 A1 Oct. 22, 2020

(51) Int. Cl.
*G06F 3/048* (2013.01)
*H04L 51/066* (2022.01)
*G06F 9/451* (2018.01)
*H04L 51/42* (2022.01)
*H04L 51/18* (2022.01)

(52) U.S. Cl.
CPC ............ *H04L 51/066* (2013.01); *G06F 9/451* (2018.02); *H04L 51/18* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 5,835,084 A | 11/1998 | Bailey et al. | |
| 7,941,491 B2 | 5/2011 | Sood | |
| 8,065,392 B2 | 11/2011 | Wilkin et al. | |
| 8,253,695 B2 | 8/2012 | Ganatra et al. | |
| 8,743,151 B1 * | 6/2014 | Fulcher | G06Q 10/107 345/684 |
| 8,780,400 B2 | 7/2014 | Shmunis et al. | |
| 9,836,724 B2 | 12/2017 | Cheng | |
| 2006/0168025 A1 * | 7/2006 | Jain | H04L 51/066 709/206 |

(Continued)

FOREIGN PATENT DOCUMENTS

EP 1947559 B1 6/2010

OTHER PUBLICATIONS

Frau et al., "Dynamic Coordinated Email Visualization", WSCG' 2005, 187-193 (2005).

(Continued)

*Primary Examiner* — William C Trapanese
(74) *Attorney, Agent, or Firm* — Marshall, Gerstein & Borun LLP; Randall G. Rueth (57) ABSTRACT

Systems and methods are provided for improving user experience in reading of email messages and other electronic communications. An interactive visualization of an electronic message may be provided, the visualization including a "dynamic message header region" that a user may cause to be collapsed and/or expanded to reduce the amount of device screen space occupied by message metadata and correspondingly increase the amount of device screen space available to display the message body, while maintaining accessibility of the while maintaining accessibility of the message metadata.

9 Claims, 7 Drawing Sheets

(56) References Cited

U.S. PATENT DOCUMENTS

2012/0331079 A1* 12/2012 Brown ................ G06Q 10/107
709/206
2014/0372446 A1  12/2014 Bell et al.
2015/0082193 A1  3/2015 Wallace et al.
2016/0219004 A1  7/2016 Erez et al.

OTHER PUBLICATIONS

"Concordance® User Guide", LexisNexis, Version 10.22:1-311 (2018).

* cited by examiner

TECHNOLOGIES FOR GENERATING VISUALIZATIONS OF ELECTRONIC COMMUNICATIONS

FIELD

The present disclosure generally relates to electronic message visualization techniques. More particularly, the present disclosure presents improved techniques for generating and modifying a visual interface for viewing email or other electronic communications.

BACKGROUND

Electronic mail ("email") messaging has seen widespread implementation in business environments, for personal use, and in various other contexts. Conventionally, a user may use an email client application available at a client computing device, and the email client application may allow the user to view, compose, and send email messages via an email client application. An email client application may be implemented, for example, as a desktop application, a mobile application, or a web application.

In any implementation, the client application may access the email messages, each of which generally include (1) a message body that includes the intended information to be communicated by the email message (e.g., plain text, images, HTML objects, and/or chained messages), and (2) a message header that indicates values of various message metadata parameters (e.g., subject, send date, sender, recipient(s), attachment(s) etc.). Typically, an email client application may provide, via a display device, a user interface that displays the contents of the email. However, technical challenges are found in generation and display of user-friendly email interfaces that conveniently display the message body and relevant message header information.

Particularly, in the case of many email messages, it may not be possible or feasible to simultaneously display the entire message body along with the entire message header. While it may be desirable to have message header information visible to the user while the user reads the body of the message, any displayed header information may consume a significant portion of the space available on a user's display. This, in turn, reduces the space available for the message body, requiring more scrolling from the user and reducing the amount of the message body that can be viewed at any one time. These challenges may be particularly prevalent in the context of client applications executing on mobile computing devices, or in the context of other client applications that, for various reasons, cannot dedicate a large amount of screen space for viewing an email.

SUMMARY

Techniques are described herein for improved visualization of email messages ("emails") in an email client application such as a desktop, mobile, or web-based application. To visually display a particular email message to a user, the email client may generate an interactive visual interface (or "visualization") of the message. The visualization may include a "dynamic message header region" that automatically adjusts in size and content to display metadata values (e.g., email subject, date, sender, recipient, attachment, etc.) with minimal intrusion upon a visual display space.

In embodiments of the techniques described herein, the email client application may cause a display device to display a visualization of an email message, the visualization including a dynamic message header region and a message body region when a user opens a particular email message. Upon opening of the message, the dynamic message header region may include a plurality of metadata values indicating the message subject, date (e.g., date and/or time at which the message was sent and/or received), sender of the message, recipient(s) of the message, and/or attachments to the message. In response to detecting a user navigation of the message body region (e.g., scrolling the message body), the client application may spatially "collapse" the header region to include just a subset of the initial plurality of metadata values (e.g., the subject and date, but not the sender, recipient(s) and attachment(s)). Subsequently, in response to the user navigating the dynamic message header region (e.g., clicking or hovering over the header), the client application may expand the dynamic message header region to include the full plurality of metadata values.

Effectively, the email client application using these techniques may reduce the amount of display space consumed by message header information when the user is parsing a body of a message, while still allowing full and convenient access to relevant message header.

In one aspect, a computer-implemented method may be provided for visually displaying an electronic message (e.g., an email message). The method may include (1) accessing the electronic message via one or more processors, (2) identifying, via the one or more processors, a plurality of metadata values of the electronic message, based upon the electronic message, (3) generating and displaying, via the one or more processors, a visualization of the electronic message at a display unit, the visualization of the electronic message comprising a dynamic message header region and a message body region, the dynamic message header region displaying the plurality of metadata values, (4) detecting, via the one or more processors, a user navigation of the message body region; and/or (5) in response to detecting the user navigation of the message body region, modifying the visualization via the one or more processors, the modified visualization including (i) the dynamic message header displaying a subset of the plurality of metadata values, and (ii) the message body region according to the detected user navigation of the message body region. The method may include additional, fewer, or alternate actions, in some embodiments.

In another aspect, a computing system may be provided, the computing system configured to visually display an electronic message (e.g., an email message). The computing system may include one or more processors and one or more memories storing non-transitory computer-executable instructions that, when executed via the one or more processors, cause the computing device to (1) access the electronic message via the one or more processors, (2) identify, via the one or more processors, a plurality of metadata values of the electronic message, based upon the electronic message, (3) generate and display, via the one or more processors, a visualization of the electronic message at a display unit, the visualization of the electronic message comprising a dynamic message header region and a message body region, the dynamic message header region displaying the plurality of metadata values, (4) detect, via the one or more processors, a user navigation of the message body region, and/or (5) in response to detecting the user navigation of the message body region, modify the visualization via the one or more processors, the modified visualization including (i) the dynamic message header region displaying a subset of the plurality of metadata values, and (ii) the message body region according to the detected user navigation of the message body region. The computing system may include additional, fewer, or alternate parts configured to perform additional, fewer, or alternate actions, in some embodiments.

In yet another aspect, one or more non-transitory computer readable media may be provided for visually displaying an electronic message (e.g., an email message). The one or more non-transitory computer readable media may comprise computer-executable instructions that, when executed via one or more processors, cause a computer to (1) access an electronic message via the one or more processors, (2) identify a plurality of metadata values of the electronic message, based upon the electronic message, (3) generate and display a visualization of the electronic message at a display unit, the visualization of the electronic message comprising a dynamic message header region and a message body region, the dynamic message header displaying the plurality of metadata values, (4) detect a user navigation of the message body region, and/or (5) in response to detecting the user navigation of the message body region, modify the visualization, the modified visualization including (i) the dynamic message header region displaying a subset of the plurality of metadata values, and (ii) the message body region according to the detected user navigation of the message body region. The one or more non-transitory computer readable media may comprise additional, fewer, or alternate instructions, in some embodiments.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

The present disclosure generally describes systems and methods via which an email client application (e.g., a desktop, mobile, or web-based client application) may generate and display an interactive visual interface (or "visualization") including a "dynamic message header region" that displays message header metadata values (e.g., message subject, date, sender, and/or recipient(s)) and a message body region that displays the body of the message. In response to detected user navigation of the visualization, the dynamic message header region and the message body region may automatically adjust in size.

As will be understood from this description, the systems and methods described herein improve the user experience in accessing and navigating email messages ("emails") and other electronic communications. Particularly, by collapsing and expanding the dynamic message header region based upon detected user navigation of the message, the systems and methods mitigate technical difficulties associated with viewing electronic communications on devices having a limited screen space. Effectively, the present techniques prevent excess occupation of screen space by message header information while a user reads the body of a message, while still allowing full and convenient access to message metadata via the dynamic message header region.

Throughout this detailed description, the techniques of the present application will be described with reference to email messaging clients and email communications. However, it should be appreciated that the techniques described herein may be similarly applied to other electronic communications exchanged over other electronic communication networks (e.g., LAN, WLAN, WAN, and/or cellular networks). Accordingly, where visualizations of email messages are described herein, it should be appreciated that visualizations may be envisioned for displaying other forms of electronic communications.

Example Interfaces for Visually Displaying an Email Message

FIGS. 1-4 depict an example interactive visual interface 100 ("visualization" or simply "interface") for displaying an email message, in accordance with some embodiments. Particularly, the interactive visual interface 100 of FIGS. 1-4 depicts example behavior of a dynamic message header region 124 according to embodiments of the present techniques.

With respect to FIGS. 1-4, the visual interface 100 will be described more particularly as visual interfaces 100.1, 100.2, 100.3, and 100.4. It should be understood that, in this detailed description, "visual interface 100" may refer to the interfaces 100.1-100.4 collectively. In some embodiments, each one of the interfaces 100.1-100.4 may be understood as "stages" of operation of the visual interface 100, with these stages possibly (but not necessarily) being displayed in the interactive visual interface 100 sequentially.

Figure 7:
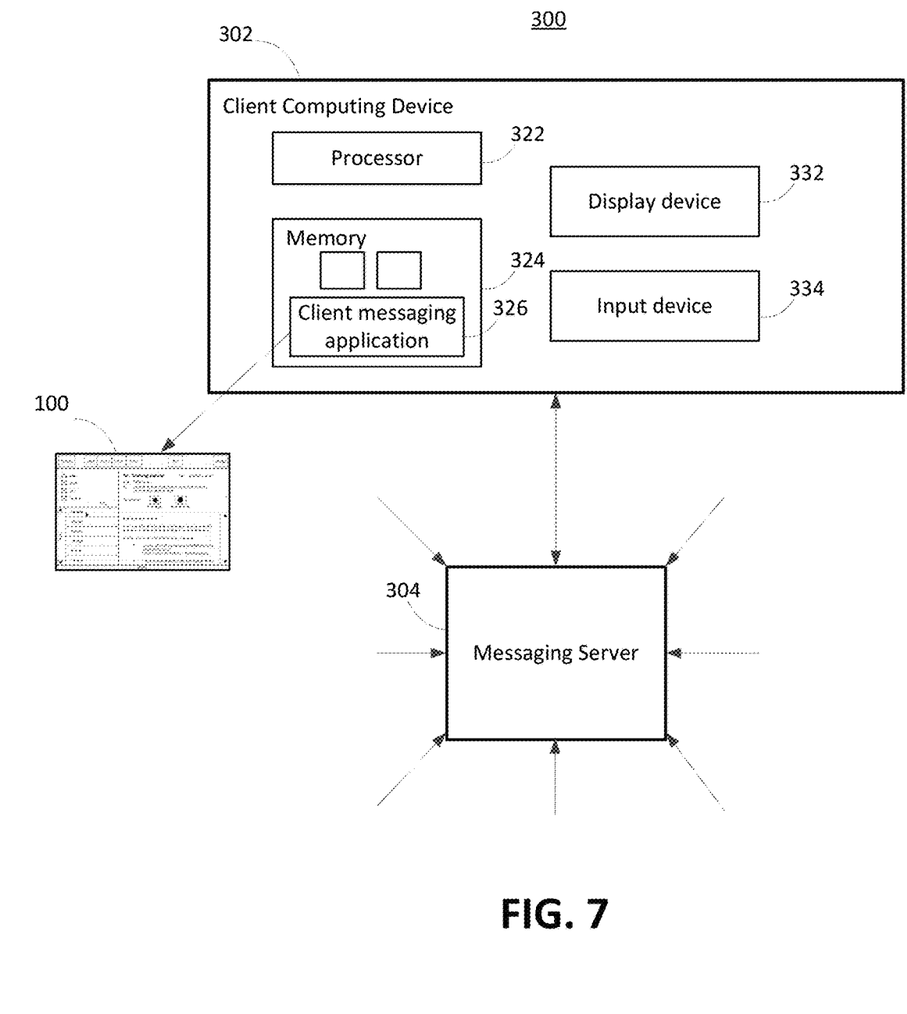
FIG. 7 depicts an example computing environment for accessing and visually displaying electronic messages, in accordance with some embodiments.

Generally speaking, the visual interface 100 of FIGS. 1-4 may be generated and displayed, for example, via elements of the computing environment to be described in this detailed description with respect to FIG. 7. In some embodiments, a client computing device (e.g., a desktop or laptop computer, smartphone, PDA, etc.) may access a client messaging application (e.g., a desktop, mobile, or web-based email messaging application) that operates to generate the visual interface 100 and display it via one or more visual display devices (e.g., a smartphone screen, computer monitor, another peripheral device, etc.). The client messaging application may further operate to modify the visual interface 100 in response to user navigation of the displayed message, as detected via user operation of one or more input devices (e.g. a touch screen, track pad, mouse, keyboard, microphone, camera, or another native or peripheral input device).

Figure 1:
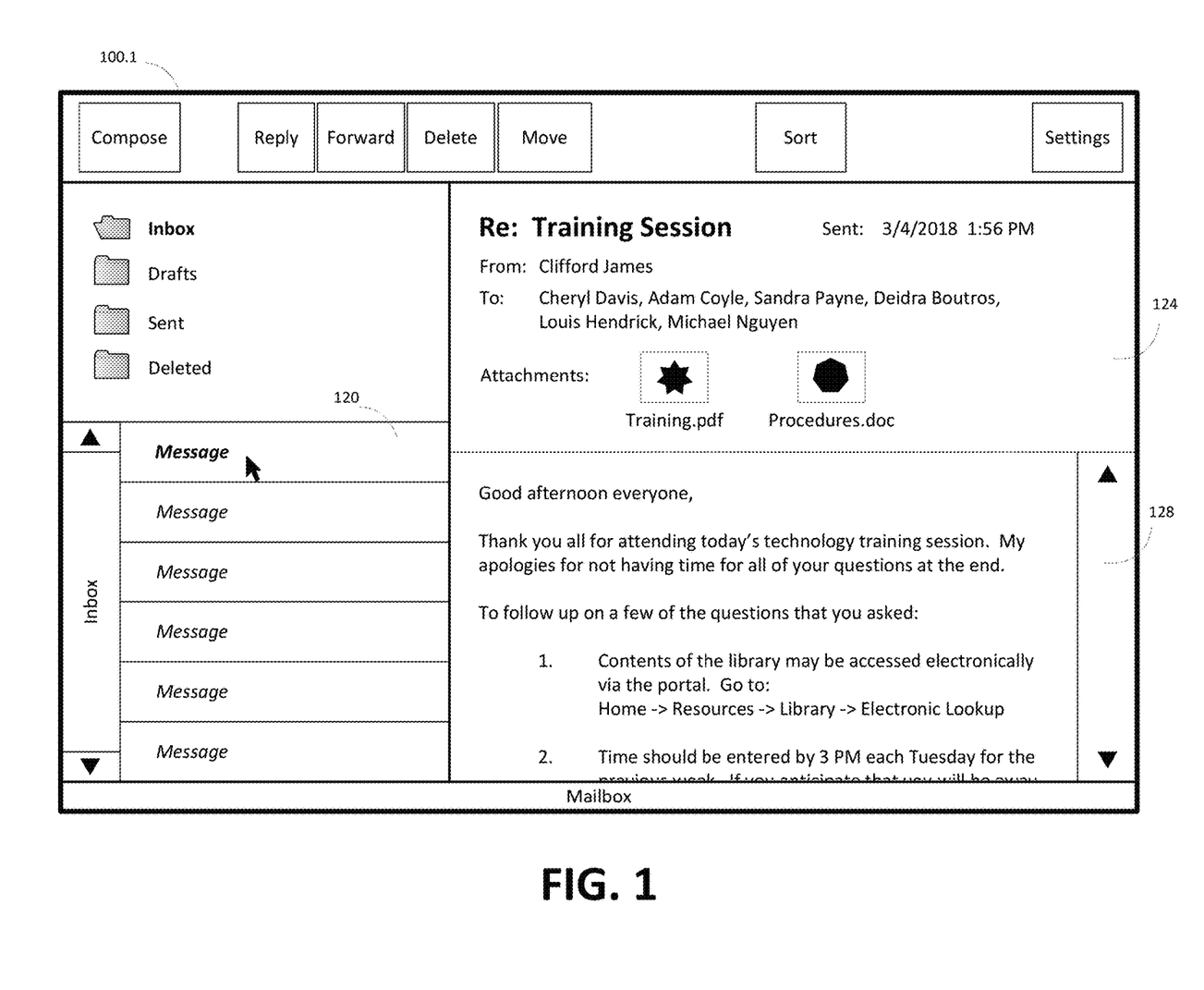
FIG. 1 depicts an example visual interface displaying an email message, the visual interface including a dynamic message header region and a message body region, in accordance with some embodiments.

FIG. 1 depicts an example visual interface 100.1 that may be displayed, for example, via a client email messaging application such as a desktop email application, a mobile application, or a web application accessed via a web browser. As should be evident from FIG. 1 (as well as FIGS. 2-4), the visual interface 100 may, in addition to providing improved visualization of email messages as described herein, enable any number of other commonly implemented email client application features, in some embodiments. For example, the visual interface 100 may provide functionality for composing new email messages, replying to or forwarding received email messages, deleting email messages, organizing email messages, creating and navigating email folders, etc.

The visual interface 100.1 includes a visualization of a particular email message 120, the visualization of the message 120 including a dynamic message header display region 124 and a message body display region 128 displayed upon "opening" of a message. Accordingly, the visual interface 100.1 as seen in FIG. 1 may, in some embodiments, be generated in response to a detected user selection of a display region corresponding to the message 120 via an input device (e.g., via a touch interaction, mouse click, hover, etc.).

Generally, as will be described herein, the dynamic message header region 124 ("header region") indicates values of a plurality of email metadata "fields" or "parameters" identified from the header of the email message. Email message metadata parameters obtained from the header may include, for example, the subject of the message, the date at which the message was sent (e.g., the date and/or time), the identity of the sender of the message, the identity of one or more recipients of the message (including direct recipients, carbon copy recipients, and/or blind carbon copy recipients), and/or one or more attachments (e.g., portable document format (PDF) files, word processor documents, image or video files, sound files, executable files, etc.). In the example according to FIG. 1, the header region 124 indicates the subject of the email, the date, the sender, multiple recipients, and two attachments.

It should be understood that, in the field of email communications, an email header may include various additional parameters, including Simple Mail Transfer Protocol (SMTP) metadata and other information that may be of lesser concern for a non-technical end user. For the sake of simplicity, such additional parameters will be omitted from this discussion, although it should be understood that any message metadata parameters may be displayed via the header region 124.

The visual interface 100.1 further includes the message body region 128. The message body region 128 ("body region") may include plain text, HTML, embedded images or videos, chained messages, etc. Further, in the context of this description, the body region 128 may include one or more navigation controls for navigating the message body, depicted in the visual interface 100.1 as a scroll mechanism adjacent to the message text. Additionally or alternatively, message body navigation controls may include touch screen field overlaying the body region 128, and/or may include any other suitable navigation controls via which a user may provide input via an input device to navigate a message.

From the visual interface 100.1 of FIG. 1, it is clear that the total amount of information displayed via the visual interface 100 may present challenges related to screen space on the device at which the visual interface 100 is displayed. That is, given the amount of space on the visual interface 100.1 occupied by header region 124 in FIG. 1, it may not be possible or feasible to simultaneously display the entirety of the message body in the body region 128. As a result, a significant portion of the body of the email message is not visible in the body region 128 in the interface 100.1.

It is generally desirable to the user of an email client application to maximize the amount of a message body visible to the user at any one time, particularly when the message includes lists, large visual media (e.g., images, videos, data tables, etc.), and/or or callbacks to earlier portions of the message, for example. At the same time, however, message metadata may also be relevant to the user, and thus the user may, at any time while reading the message body, wish to access the message metadata without losing the user's progress in reading the message body. In other words, it may be undesirable to navigate to the "top" of the message to access the header information, and then navigate back "downward" to return to reading the message body. The techniques of the visual interface 100 alleviate at least these technical challenges, as will be further evident from the depictions of the visual interface 100 throughout FIGS. 2-4.

Figure 2:
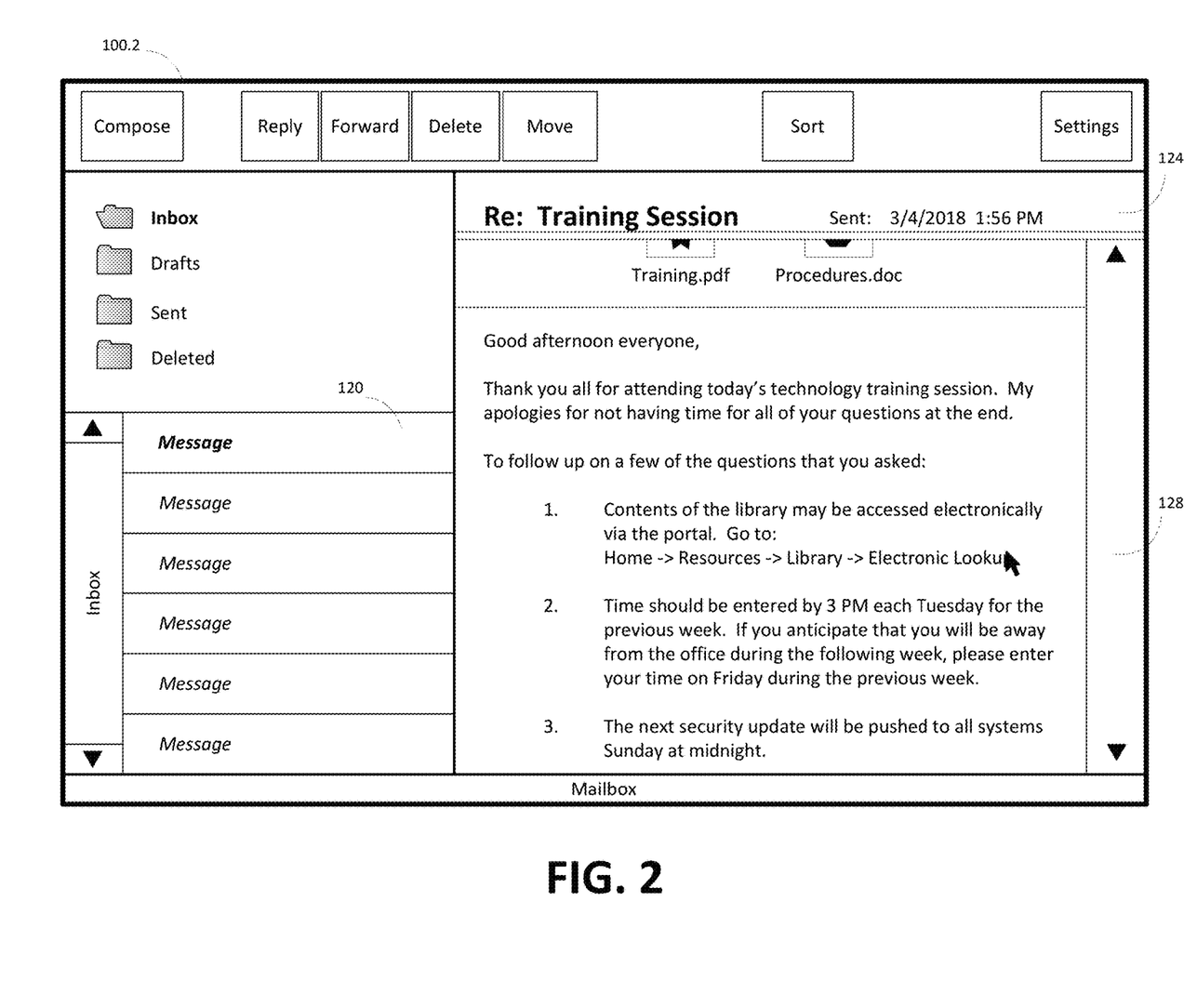
FIG. 2 depicts the example visual interface of FIG. 1, the visual interface modified in response to a detected user navigation, in accordance with some embodiments.

FIG. 2 depicts an example visual interface 100.2 which may be displayed, for example, as a modification to the interface 100.1 generated and displayed in response to a detected user navigation of the message body region 128 as depicted in the interface 100.1 of FIG. 1.

A detected user navigation of the message body region 128 may include a detected user navigation received via any suitable user input device. The detected user navigation may include, for example, a touch screen interaction received via a touch display screen, a mouse click anywhere within the body region 128, a hover of a mouse over the body region 128, a key press corresponding to navigation of the body region 128 (e.g., a down arrow indicating downward navigation through the interface 100.1), a detected vocal input corresponding to navigation of the body region 128 received via a microphone, a detected gesture corresponding to navigation of the body region 128 received via a camera, and/or other detected user navigation including any combination thereof.

In the visual interface 100.2 of FIG. 2, the dynamic message header region 124 is collapsed to include only a subset of the email header information displayed in the header region 124 in FIG. 1. That is, while the header region 124 in FIG. 1 displays a plurality of message metadata parameter values including the message subject, date, sender, recipients, and attachments, the header region 124 in FIG. 2 displays the message subject and date, but does not indicate the sender, recipients, or attachments.

Thus, it is shown that as a user navigates the body of the displayed email message, the visual interface 100 may be automatically altered in the manner depicted in FIG. 2 to partially collapse the dynamic message header region 124, thereby reducing the amount of screen space occupied by the header region 124, and correspondingly increasing the amount of screen space available for the body region 128. FIG. 2 shows an expanded screen space occupied by the body region 128 in the interface 100.2, the message body region 128 thereby making visible a larger portion of the email message.

In some use cases (e.g., viewing a short email message), the expansion of the message body region 128 in the interface 100.2 may make visible the entire body of the email message. However, many email communications may be of sufficient length that the entire email message may not be simultaneously visible in the interface 100.2. Accordingly, the message body region 128 of the interface 100.2 may retain the one or more user navigation controls (e.g., the scroll mechanism) originally shown in the interface 100.1. The one or more navigation controls may, for example, enable a user to scroll upward and/or downward through the message, up to or even including some metadata values (e.g., the message attachments partially appearing in the interface 100.2 at the top of the message body region 128).

Figure 3:
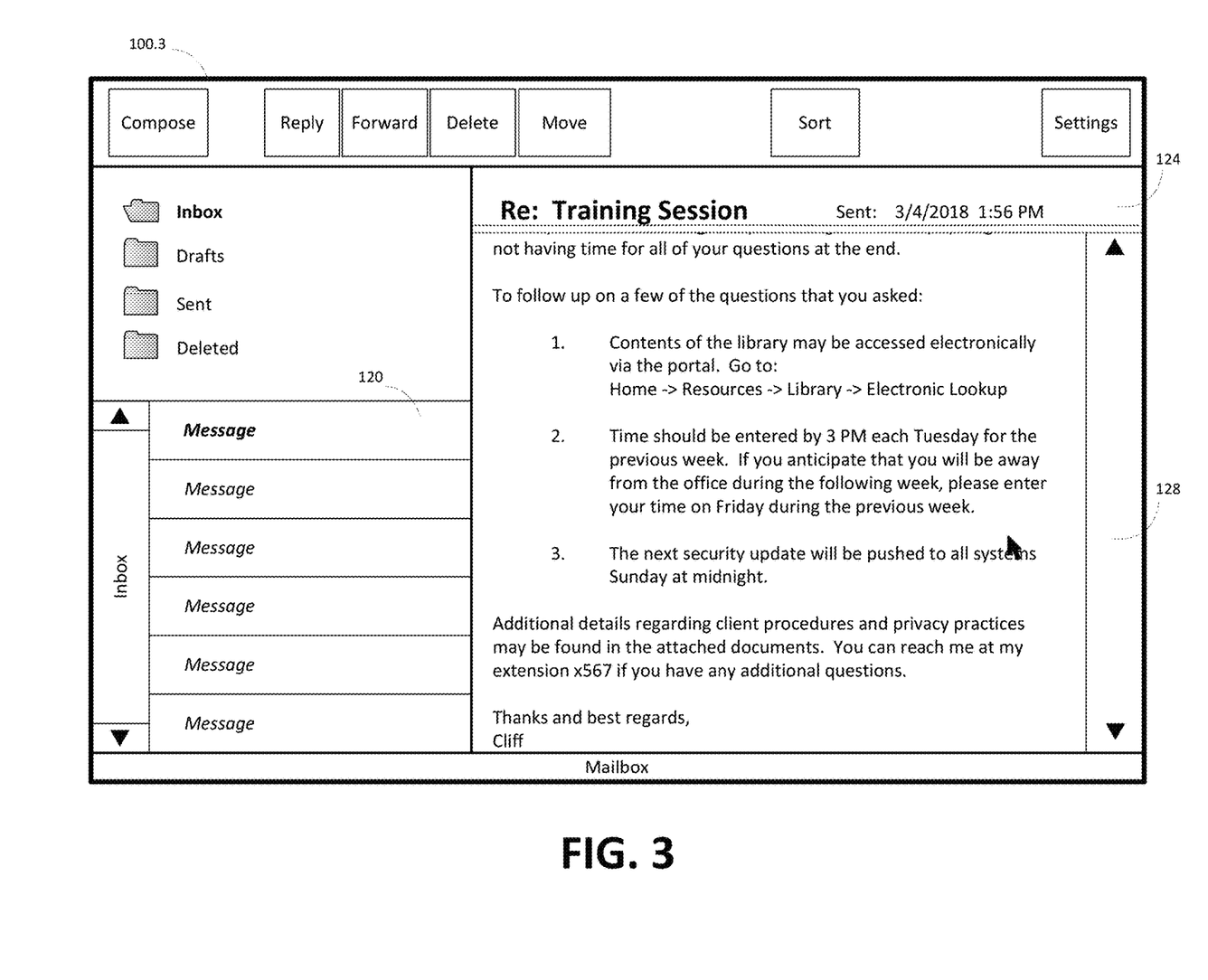
FIG. 3 depicts the example visual interface of FIG. 2, the visual interface modified in response to a detected further user navigation, in accordance with some embodiments.

FIG. 3 depicts an example visual interface 100.3 that may be generated and displayed, for example, as a modification to the interface 100.2 in response to a detected user navigation of the message body region 128 of the interface 100.2. The detected user navigation may be, for example, a downward navigation using the scroll mechanism included in the message body region 128.

As is evident from FIG. 3, the visual interface 100.3 retains many characteristics from the visual interface 100.2 of FIG. 2. That is, the interface 100.3 includes the collapsed dynamic message header region 124 and the body region 128, each occupying a same amount of screen space as in the interface 100.2. As depicted in FIG. 3, the user has navigated the body region 128 to arrive at the bottom of the message. Similarly to FIG. 2, the collapsing of the header region 124 in the interface 100.3, with the corresponding expansion of the body region 128, reduces the extent of user navigation required to navigate to the bottom of the message, and increases the amount of the message body visible at any one moment within the body region 128.

Figure 4:
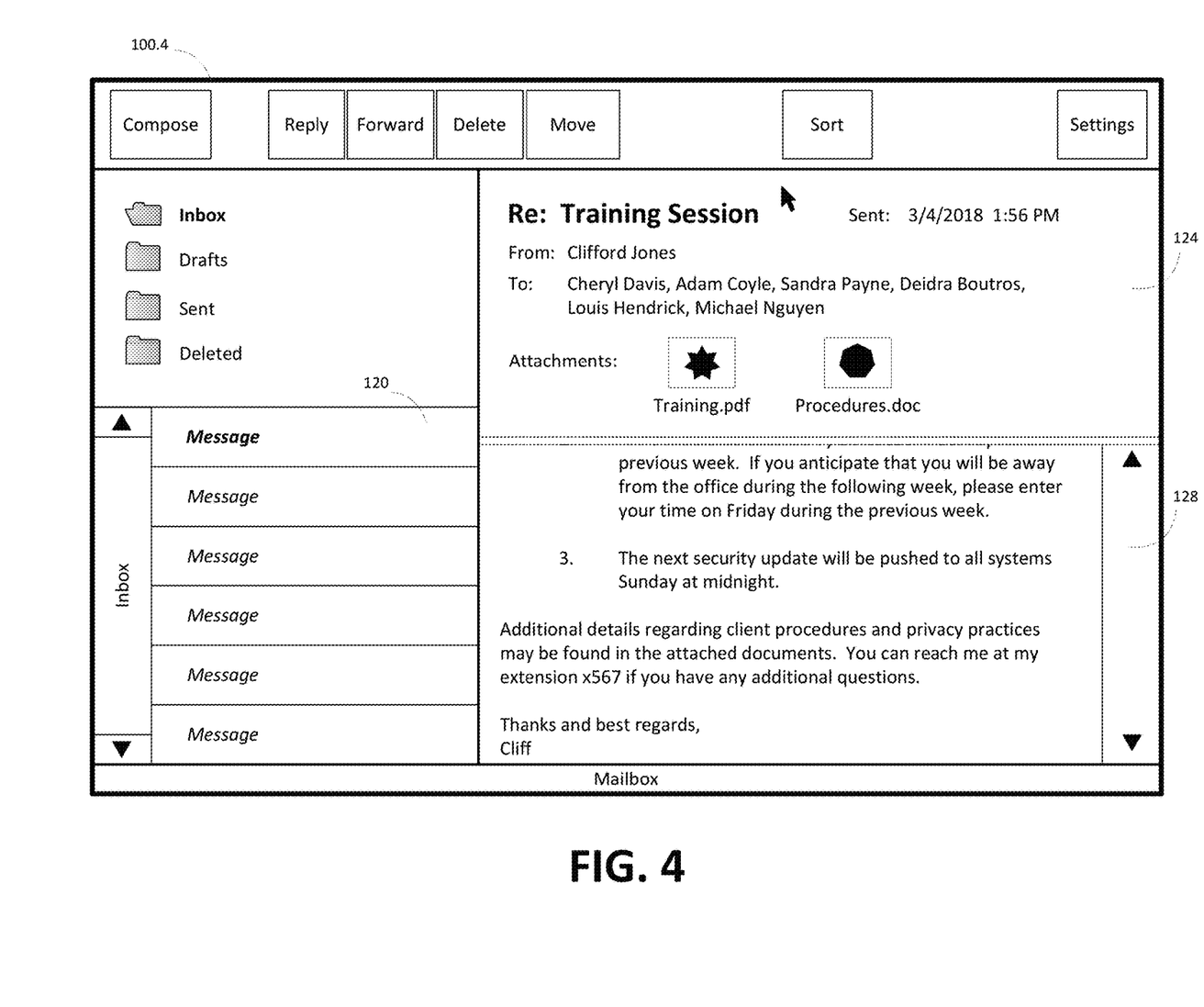
FIG. 4 depicts the example visual interface of FIG. 3, the visual interface modified in response to a detected still further user navigation, in accordance with some embodiments.

The "dynamic" aspect of the dynamic message header region 124 in the interface 100 is not limited to collapsing of the header region 124. FIG. 4 depicts an example visual interface 100.4 that may be generated and displayed, for example, as a modification to the interface 100.2 or 100.3 in response to a detected user navigation of the dynamic message header region 124. The detected user navigation of the header region 124 may include, for example, a touch screen interaction received via a touch display screen, a mouse click anywhere within the header region 124, a hover of a mouse over the header region 124, a key press corresponding to navigation of the header region 124, a detected vocal input corresponding to navigation of the header region 124 received via a microphone, a detected gesture corresponding to navigation of the header region 124 received via a camera, and/or other detected user navigation including any combination thereof.

In any case, responsive to the detected user navigation of the header region 124, the visual interface 100.4 may include the header region 124 expanded to indicate the plurality of metadata values. In embodiments of the present techniques, the plurality of metadata values displayed in the header region 124 in the interface 100.4 may be identical to the plurality of values displayed in the header region 124 in the interface 100.1. In other words, expansion of the dynamic message header region 124 in the interface 100.4 may restore the entirety of the originally-displayed message metadata.

The visual interface 100.4 may further include the message body region 128 partially collapsed in accordance with the expansion of the header region 124. The body region 128 may be displayed in the interface 100.4 in accordance with the user's previous navigation of the body of the message (e.g., previous scrolling navigation as reflected in the interface 100.3 of FIG. 3). For example, as shown in FIG. 4, the collapsing of the body region 128 may cover up the top portion of the message body text previously visible in the interface 100.3, leaving the closing of the message visible. Alternatively, the expansion of the dynamic message header region 124 in the interface 100.4 may cause the body of the message to be "pushed" downward. That is, the top portion of the previously visible message body text may remain visible in the body region 128, with the bottom portion of the previously visible text not visible in the body region 128.

It should be understood that further interaction in the visual interface 100 is envisioned, in some embodiments. For example, subsequent to display of the interface 100.4, the user may return to navigation within the message body region 128, causing further modification of the visual interface 100.4 in a manner similar to that described with respect to the interfaces 100.2 and 100.3 (e.g., collapsing of the dynamic message header region 124 and corresponding expansion of the message body region 128, or vice versa).

Via the visual interface modification shown in FIG. 4, the interactive visual interface 100 may allow a user to view metadata associated with the email message in an "on-demand" manner, with the visual interface 100 providing improved viewing of the message body by allocating further screen space to the message body region 128 when the user does not require access to the message metadata.

Various alterations of the above-described techniques are possible, in some embodiments. For example, the particular message metadata parameters for which values are displayed in the expanded or collapsed dynamic message header region 124 may differ from the parameters described above, in some embodiments. As just one example, the expanded dynamic message header region 124 may or may not indicate the attachments to the email message, even if one or more attachments exist. As another example, in some embodiments, an expanded header region 124 may include various SMTP message routing information associated with the email message, in some embodiments.

Example Computer-Implemented Methods for Visually Displaying Emails

Figure 5:
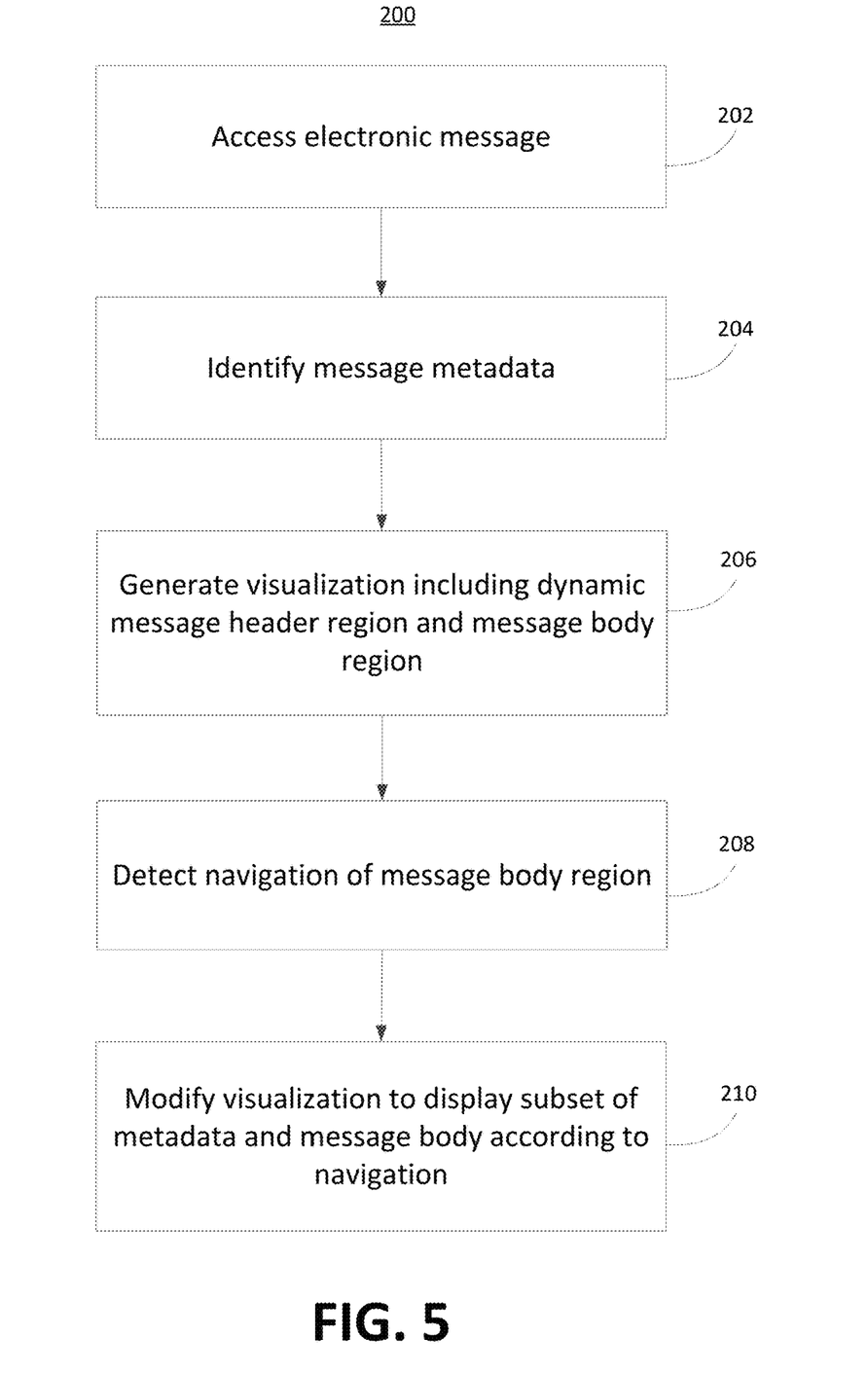
FIG. 5 depicts an example computer-implemented method for visually displaying an electronic message, in accordance with some embodiments.
Figure 6:
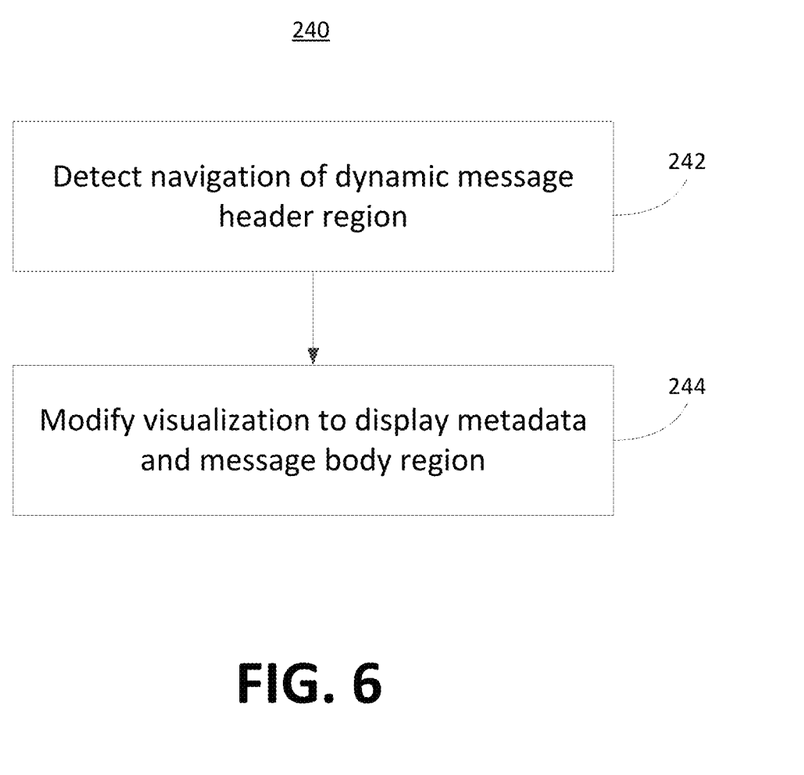
FIG. 6 depicts an example computer-implemented method for further modifying a visual display of an electronic message, in accordance with some embodiments.

FIGS. 5 and 6 depict example computer-implemented methods 200 and 240, respectively, for visually displaying an email message, in accordance with some embodiments. The methods 200 and/or 240 may be implemented, for example, via elements of the computing environment to be described in this detailed description with reference to FIG. 7. Further, execution of the methods 200 and/or 240 may, for example, include display of an interactive visual interface such as the interactive visual interface 100 (e.g., one or more of the visual interfaces 100.1-100.4) depicted in FIGS. 1-4. In some embodiments, either or both of the methods 200 and 240 may be executed via one or more computer processors executing instructions stored on one or more computer readable media.

Referring first to FIG. 5, the method 200 may include accessing an electronic message (202). The electronic message may be an email message, in some embodiments. Accessing the electronic message may include retrieving an existing electronic message stored at a computer memory at a computer and/or a messaging server. Additionally or alternatively, accessing the electronic message may include receiving the electronic message via one or more communication networks (e.g., receiving an email message transmitted from another computing device via one or more mail servers, which may communicate via a LAN, WAN, or other suitable one or more communication networks and protocol).

The method 200 may further include identifying a plurality of metadata values of the electronic message, based upon the electronic message (204). In one example, identifying the plurality of metadata values may include parsing header data from an accessed email message. Accordingly, the identified plurality of metadata values may include at least some of the email message metadata (e.g., message subject, date, sender, recipient(s), and/or attachment(s)).

The method 200 may further include generating a visualization of the electronic message to be displayed via a display unit (206). Generating the visualization may include causing the visualization to be displayed via the display unit. The visualization may include, for example, an interactive visual interface such as the interface 100 depicted in FIGS. 1-4 (e.g., the interface 100.1). The display unit may include, for example, a native screen of a smartphone, PDA, desktop computer, laptop computer, etc. Additionally or alternatively, the display unit may include a "peripheral" display device such as a computer monitor, television screen, or projector not physically included within a device at which actions of the method 200 is performed, but still communicatively connected to the device at which the method 200 is performed.

In any case, the visualization of the electronic message may include a dynamic message header region and a message body region. The displayed header region may display the plurality of metadata values (e.g., values corresponding to metadata parameters or "fields" in an email header). In some embodiments, the displayed metadata values may include a message subject, a message date (e.g., date and/or time at which the message was sent), message sender, message recipient(s), and/or one or more attachments.

The method 200 may further include detecting a user navigation of the message body region (208). The detected user navigation may include a detected navigation received via one or more input devices, such as a computer mouse, track pad, keyboard, touch screen, microphone, camera, etc. The one or more input devices may include an input device native to a computing device at which other actions of the method 200 are performed. Additionally or alternatively, the input device may include a peripheral input device communicatively connected to the computing device via a wired or wireless connection. The detected user navigation of the message body region may include, for example, a mouse click, mouse hover, keyboard press, touch screen tap or swipe gesture, audio input, physical motion, and/or any other suitable input that may be indicative of a user's navigation through the electronic message in the message body region.

The method 200 may further include, in response to the detection of the user navigation of the message body region, modifying the visualization of the electronic message (210). Modifying the visualization may produce a modified visualization including the dynamic message header displaying a subset (e.g., some, but not all) of the plurality of metadata values previously displayed in the visualization. For example, the dynamic message header region in the modified visualization may display the message subject and date, but not the sender, recipient(s), and/or attachment(s). In any case, modifying the visualization may include causing the modified visualization to be displayed via the display unit.

The modified visualization may further include the message body region according to the user navigation of the message body region. For example, when the user navigation of the message body region indicates downward scrolling through the electronic message, the modified visualization may include the message body region displaying text of the message partially scrolled (e.g., as in the interface 100.2 or 100.3 of FIGS. 2 and 3, respectively).

The modified visualization of the electronic message may include the dynamic message header region at least partially collapsed to occupy less space within the modified visualization, as compared to the previously provided visualization of the electronic message. The modified visualization may include the message body region at least partially expanded, in accordance with the collapsing of the dynamic message header region.

The method 200 may include additional, fewer, or alternate actions, in some embodiments. For example, the modified visualization may be further modifiable in response to detected further user navigation of the dynamic message header region and/or message body region, in some embodiments.

Now referring to FIG. 6, the method 240 may, in some embodiments, be performed subsequent to performance of the method 200. In other words, the method 240 may be performed to further modify a visualization of the electronic message previously generated, displayed, and/or modified at least partially according to the method 200.

The method 240 may include detecting a further user navigation of the dynamic message header region (242). The further user navigation may be received via one or more input devices, such as a computer mouse, keyboard, track pad, touch screen, microphone, camera, etc. The one or more input devices may include an input device native to a computing device at which other actions of the method 200 are performed. Additionally or alternatively, the input device may include a separate, peripheral input device communicatively connected to the computing device via a wired or wireless connection. The detected further user navigation of the dynamic message header region may include, for example, a mouse click, mouse hover, keyboard press, touch screen tap or swipe gesture, audio input, physical motion, and/or any other suitable input that may be indicative of a user's navigation to the dynamic message header region.

The method 240 may include, in response to the detected further navigation of the dynamic message header region, modifying the visualization of the electronic message (244). Further modifying the visualization may include causing the further modified visualization to be displayed via the display unit. The further modified visualization may include the dynamic message header displaying the plurality of metadata values (e.g., message subject, date, sender, recipient(s), and/or attachment(s)). The further modified visualization may further include the message body region, which may include the message body in accordance with any one or more previous navigations of the message body (e.g., according to the detected navigation in the method 200).

The resulting further modified visualization may effectively make visible the plurality of metadata values in response to a user's indication to view the message metadata. The further modified visualization may include the dynamic message header region expanded to provide the plurality of metadata values, with the message body region collapsed accordingly.

The method 240 may include additional, fewer, or alternate actions, in some embodiments.

Example Computing Environment for Displaying Electronic Messages

FIG. 7 depicts an example computing environment 300 for receiving, accessing, and/or displaying electronic messages, in accordance with some embodiments. The components of the computing environment 300 may be operable to perform the methods 200 and/or 240, in some embodiments. Furthermore, the components of the computing environment 300 may be operable to produce an interactive visualization of an electronic message, such as the visual interface 100 depicted in FIGS. 1-4.

The computing environment 300 includes a client computing device 302 and a messaging server 304, with the client computing device 302 generally operable to receive, access, store, and/or display electronic communications obtained via the messaging server 304. The client computing device 302 may be, for example, a desktop computer, laptop computer, smartphone, PDA, and/or another suitable computing device. The messaging server 304 may include one or more computer servers that may be physically disposed in one or more physical locations. The client computing device and 302 and the messaging server 304 may exchange unidirectional or bidirectional communications over any suitable communication network, which may include one or more wired networks (e.g., an LAN) and/or one or more wireless networks (e.g., a WAN, WLAN, cellular communications network, etc.). Unidirectional arrows facing the messaging server 304 in FIG. 7 represent communications (e.g., email communications) that may be transmitted to the messaging server 304 via other computing devices (e.g., other client computing devices and/or servers) and received at the messaging server 304.

While one client computing device 302 will be described herein, it should be understood that the techniques described herein may be applied to each of a plurality of client computing devices 302, in some embodiments. Furthermore, although this description will particularly describe the exchange, access, and display of email messages, it should be understood that the computing environment 300 may additionally or alternatively be operable to receive, access, store, and/or display other forms of electronic communications, in some embodiments.

The client computing device 302 may include a processor 322 (i.e., one or more computer processors), and a computer memory 324. The computer memory 324 may include one or more random-access memories (RAM) and/or one or more persistent, read-only memories or "program memories" (ROM). More particularly, a program memory included in the computer 324 may include a client messaging application 326 (e.g., a mobile application or desktop application) configured to engage to cause the client computing device 302 to engage in unidirectional or bidirectional communications with the messaging server 304. In some embodiments, the client messaging application 326 may additionally or alternatively be disposed separately from the client computing device 302. For example, the client messaging application 326 may include a web application accessible from the client computing device 302 via a web browser application installed and/or operating at the client computing device 302.

In some embodiments, the client messaging application 326 may include a mail user agent (MUA) configured to send and/or receive email messages via the messaging server 304 using known email messaging protocol such as Simple Mail Transfer Protocol (SMTP), Internet Message Access Protocol (IMAP), and/or Post Office Protocol (POP). Accordingly, the messaging server 304 may include a mail submission agent (MSA) configured to receive outgoing email messages transmitted via one or more MUA. The messaging server 304 may additionally or alternatively include a mail transfer agent (MTA) configured to transfer email messages to one or more destinations, which may include one or more email servers and/or other computing devices remote from the messaging server 304. The messaging server 304 may additionally or alternatively include a mail delivery agent (MDA) configured to deliver and/or store email messages at a "mailbox" associated with a particular user (e.g., an email mailbox associated with a user of the client computing device 302). The MUA at the client computing device 302 may retrieve email messages stored at the mailbox associated with a user at the messaging server 304 (e.g., retrieve messages associated with a logged-on email user). In some embodiments, the client computing device 302 may store retrieved email messages at the memory 324. In any case, accessing an email via a MUA may include parsing the email to identify values of particular message metadata parameters, as described herein.

The client messaging application 326 may include a user interface (e.g., the interactive visual interface 100) operable to displaying one or more email messages to the user. The client messaging application may display the user interface via a display device 332 (i.e., one or more display devices). The display device 332 may include, for example, a native display screen (e.g., a touch screen) of the client computing device 302. While FIG. 7 shows the display device 332 included within the client computing device 302, it should be understood that the display device 332 may additionally or alternatively include a peripheral visual display device such as a computer monitor, television screen, projection device, or other device not physically located within the client computing device 302, but still communicatively connected to the client computing device 302 via one or more wired or wireless connections.

The user interface provided by the client messaging application 326 may be configured to detect user input provided by a user via an input device 334 (i.e., one or more input devices). The input device 334 may include, for example, a touch screen, track pad, mouse, keyboard, camera, or microphone. It should be appreciated that while FIG. 7 shows the input device 334 included within the client computing device 302, the input device 334 may additionally or alternatively include a peripheral input device not physically located within the client computing device 302, but still communicatively connected to the client computing device 302 via one or more wired or wireless connections. In any case, the client messaging application 326 may be configured to generate, modify, and/or display the user interface via the display device 332 in accordance with detected user input received via the input device 334.

The computing environment 300 may include additional, fewer, or alternate components, in some embodiments.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method for visually displaying an electronic message, the method comprising:
    accessing the electronic message via one or more processors, the electronic message comprising (i) a message header comprising a plurality of metadata values, and (ii) a message body, the plurality of metadata values comprising a message subject, a message sender, a set of message recipients, and a message sent date;
    generating, via the one or more processors, a visualization of the electronic message to be displayed via a display unit, the visualization of the electronic message comprising a dynamic message header panel and a message body panel;
    displaying, via the display unit, the visualization in which the dynamic message header panel displays the plurality of metadata values and the message body panel displays at least a portion of the message body, the dynamic message header panel displayed separately from the message body panel;
    detecting, via the one or more processors, a downward scroll within the message body panel;
    in response to detecting the downward scroll within the message body panel, modifying, via the display unit, the visualization including:
        collapsing the dynamic message header panel such that (i) the message subject and the message sent date remain in the same location of the dynamic message header panel, and (ii) the message sender and the set of message recipients are removed from the dynamic message header panel, and
        displaying the message body panel separate from the dynamic message header panel and according to the detected downward scroll within the message body panel;
    after modifying the visualization, detecting, via the one or more processors, a hover gesture made by an input device over the dynamic message header panel; and
    in response to detecting the hover gesture made by the input device, further modifying the visualization by expanding the dynamic message header panel to display the plurality of metadata values.

2. The computer-implemented method of claim 1, wherein accessing the electronic message includes accessing an electronic mail message, and wherein displaying the visualization comprises displaying the visualization via an electronic mail client application.

3. The computer-implemented method of claim 2, wherein accessing the electronic mail message includes receiving the electronic mail message via the electronic mail client application using an electronic mail transfer protocol.

4. A computer device configured to visually display an electronic message, the computer device comprising:
    a user interface;
    one or more processors; and
    one or more memories storing non-transitory computer-executable instructions that, when executed via the one or more processors, cause the computer device to:
        access the electronic message via the one or more processors, the electronic message comprising (i) a message header comprising a plurality of metadata values, and (ii) a message body, the plurality of metadata values comprising a message subject, a message sender, a set of message recipients, and a message sent date,
        identify, via the one or more processors, a plurality of metadata values of the electronic message, based upon the electronic message,
        generate, via the one or more processors, a visualization of the electronic message to be displayed via a display unit, the visualization of the electronic message comprising a dynamic message header panel and a message body panel,
        cause the user interface to display the visualization in which the dynamic message header panel displays the plurality of metadata values and the message body panel displays at least a portion of the message body, the dynamic message header panel displayed separately from the message body panel,
        detect, via the one or more processors, a downward scroll within the message body panel,
        in response to detecting the downward scroll within the message body panel, modify, in the user interface, the visualization including:
            cause the user interface to collapse the dynamic message header panel such that (i) the message subject and the message sent date remain in the same location of the dynamic message header panel, and (ii) the message sender and the set of message recipients are removed from the dynamic message header panel, and cause the user interface to display, within the message body panel separate from the dynamic message header panel and according to the detected downward scroll within the message body panel, after modifying the visualization, detect a hover gesture made by an input device over the dynamic message header panel, and in response to detecting the hover gesture made by the input device, further modify, in the user interface, the visualization by expanding the dynamic message header panel to display the plurality of metadata values.

5. The computer device of claim 4, wherein the electronic message is an electronic mail message, and wherein the display of the visualization is a display via an electronic mail client application.

6. The computer device of claim 5, wherein the electronic mail message is accessed via an electronic mail transfer protocol.

7. One or more non-transitory computer readable media storing non-transitory computer-executable instructions that, when executed via one or more processors, cause a computer to:

access an electronic message via the one or more processors, the electronic message comprising (i) a message header comprising a plurality of metadata values, and (ii) a message body, the plurality of metadata values comprising a message subject, a message sender, a set of message recipients, and a message sent date;

identify a plurality of metadata values of the electronic message, based upon the electronic message, generate a visualization of the electronic message to be displayed via a display unit, the visualization of the electronic message comprising a dynamic message header panel and a message body panel;

display, via the display unit, the visualization in which the dynamic message header displays the plurality of metadata values and the message body panel displays at least a portion of the message body, the dynamic message header panel displayed separately from the message body panel;

detect a downward scroll within the message body panel; and in response to detecting the downward scroll within the message body panel, modifying, via the display unit, the visualization including:

collapsing the dynamic message header panel such that (i) the message subject and the message sent date remain in the same location of the dynamic message header panel, and (ii) the message sender and the set of message recipients are removed from the dynamic message header panel, and displaying the message body panel separate from the dynamic message header panel and according to the detected downward scroll within the message body panel;

after modifying the visualization, detecting a hover gesture made by an input device over the dynamic message header panel; and in response to detecting the hover gesture made by the input device, further modifying, via the display unit, the visualization by expanding the dynamic message header panel to display the plurality of metadata values.

8. The one or more non-transitory computer readable media of claim 7, wherein the electronic message is an electronic mail message, and wherein the display of the visualization is a display via an electronic mail client application.

9. The one or more non-transitory computer readable media of claim 8, wherein the instructions to access the electronic mail message include instructions to receive the electronic mail message via an electronic mail transfer protocol.

* * * * *